United States Patent
Tsai et al.

(10) Patent No.: US 8,239,710 B2
(45) Date of Patent: Aug. 7, 2012

(54) COMMUNICATION METHODS AND SYSTEMS HAVING PERMUTATION SCHEMES

(75) Inventors: Chia-Lung Tsai, Hsinchu (TW); Yu-Tao Hsieh, Hsinchu (TW); Jen-Yuan Hsu, Jincheng Township (TW); Pang-An Ting, Fongyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 599 days.

(21) Appl. No.: 12/503,584

(22) Filed: Jul. 15, 2009

(65) Prior Publication Data

US 2010/0111208 A1    May 6, 2010

Related U.S. Application Data

(60) Provisional application No. 61/110,134, filed on Oct. 31, 2008, provisional application No. 61/159,524, filed on Mar. 12, 2009.

(51) Int. Cl.
    *G06F 11/00* (2006.01)
(52) U.S. Cl. ..................... 714/701; 375/260
(58) Field of Classification Search .................. 714/701; 375/260

See application file for complete search history.

(56) References Cited

U.S. PATENT DOCUMENTS

| | | | |
|---|---|---|---|
| 6,359,874 B1 * | 3/2002 | Dent | 370/342 |
| 6,603,412 B2 * | 8/2003 | Gatherer et al. | 341/61 |
| 7,305,593 B2 * | 12/2007 | Andreev et al. | 714/701 |
| 2010/0039286 A1 * | 2/2010 | Robbins | 340/855.3 |

OTHER PUBLICATIONS

Fwu, Jong-Kae (JK), et al., "Proposed Text of DL Physical Layer Section for the IEEE 802.16m Amendment", IEEE 802.16 Broadband Wireless Access Working Group, IEEE C802.16m-08/1443r2, Nov. 3, 2008.

Lomnitz, Yuval, et al., "Symbol structure design for 802.16m—resource blocks and pilots", IEEE 802.16 Broadband Wireless Access Working Group, IEEE C802.16m-08/121, Mar. 10, 2008.

\* cited by examiner

*Primary Examiner* — M. Mujtaba K Chaudry
(74) *Attorney, Agent, or Firm* — Finnegan, Henderson, Farabow, Garrett & Dunner, LLP

(57) ABSTRACT

A wireless communication method implemented in a communication system may include receiving a data sequence to be permuted, and obtaining information associated with the data sequence to be permuted, the information containing at least a length of the data sequence and a sampling spacing for permuting the data sequence. The method may also include identifying a first portion of the data sequence having a first number of adjacent data items, and a second portion of the data sequence having a second number of adjacent data items. The method may also include accessing the first number of data items from the first portion at the sampling spacing, and placing the accessed first number of data items into a predetermined number of sub-blocks included within a permuted data sequence to be generated based on the received data sequence. The method may further include inserting each of the second number of data items into an end position of one of the sub-blocks within the permuted data sequence, and outputting the permuted data sequence.

26 Claims, 7 Drawing Sheets

COMMUNICATION METHODS AND SYSTEMS HAVING PERMUTATION SCHEMES

PRIORITY

This application claims the benefit of priority of U.S. Provisional Application No. 61/110,134, filed Oct. 31, 2008 and titled "PERMUTATION DESIGN," and U.S. Provisional Application No. 61/159,524, filed Mar. 12, 2009, and titled "COMMUNICATION METHODS AND SYSTEMS WITH PERMUTATION SCHEMES," the entire contents of which are incorporated herein by reference.

TECHNICAL FIELD

The present disclosure relates generally to communication methods and systems and, more particularly, to communication methods and systems having permutation schemes.

BACKGROUND

In modern communication systems, signals may be transmitted from a source location to a destination location in analog or digital forms. As an example, the use of digital data communication may increase capacity of data transmission, flexibility of data manipulation, etc. Signals containing data, such as data derived from test, image, voice, video, etc., may be encoded into sequences of symbols or binary symbols, which are then transmitted from a transmitter to a receiver through one or more communication channels, such as via a cable or over-the-air.

In digital communication systems, data can be transmitted through one or more frequency bands within a finite frequency bandwidth. When multiple channels are used, these channels may overlap one another, and interferences may occur between the overlapped channels. One method to reduce or eliminate the interferences is to utilize orthogonal frequency division multiplexing (OFDM). In an OFDM system, a single channel may include multiple subcarriers having different but adjacent frequency bands. Although these subcarriers may overlap one another, they are orthogonal to one another, thereby reducing or eliminating the interferences caused by frequency overlap.

Examples of OFDM communication systems include systems complying with IEEE 802.16e or 802.16m standards. One version of such standards includes a proposal to IEEE C802.16m-08/1443 standard, titled "Proposed Text of DL Physical Layer Section for the IEEE 802.16m Amendment" ("Reference 1"). In a system consistent with Reference 1, permutation is utilized to increase the diversity of a channel coding block by changing the location of data subcarriers. It is preferable to evenly permute the contiguous data subcarriers in physical frequency to prevent a forward error correction (FEC) block from bursting errors. The forward error correction block is used to correct errors in the data stream as long as the number of the errors is under control. However, when there are too many errors in the FEC block, the FEC block can no longer be used to correct the errors. By applying permutation, the burst errors in frequency or time domain can be distributed to several FEC blocks so that each block can be used to correct errors. In the proposal to IEEE 802.16m standard, i.e., Reference 1, a large table of permutation sequences is relied upon to obtain the results of random distribution. However, this method may require a large number of additional memories or other storage devices for storing the large permutation sequence table, which may lead to increased hardware complexity and degraded system performance in certain applications.

Therefore, it may be desirable to have alternative communication systems and methods having alternative permutation schemes.

SUMMARY

In one exemplary embodiment, the present disclosure is directed to a wireless communication method implemented in a communication system. The method includes receiving a data sequence to be permuted, and obtaining information associated with the data sequence to be permuted, the information containing at least a length of the data sequence and a sampling spacing for permuting the data sequence. The method also includes identifying a first portion of the data sequence having a first number of adjacent data items, and a second portion of the data sequence having a second number of adjacent data items. The method also includes accessing the first number of data items from the first portion at the sampling spacing, and placing the accessed first number of data items into a predetermined number of sub-blocks included within a permuted data sequence to be generated based on the received data sequence. The method further includes inserting each of the second number of data items into an end position of one of the sub-blocks within the permuted data sequence, and outputting the permuted data sequence.

In one exemplary embodiment, the present disclosure is directed to a wireless communication method implemented in a communication system. The method includes receiving a data sequence to be permuted, and identifying at least a length of the data sequence and a sampling spacing for permutation. The method also includes identifying a first portion and a second portion of the data sequence, the first portion having a first length and containing a first number of adjacent data items, the second portion having a second length and containing a second number of adjacent data items. The method also includes providing a first number of positions within a permuted data sequence for the first number of data items from the first portion based on the sampling spacing, and providing a second number of positions within the permuted data sequence for the second number of data items based on the first number of determined positions. The method further includes processing the permuted data sequence for wireless communication.

In one exemplary embodiment, the present disclosure is directed to a system for wireless communication. The system includes an input interface configured to receive a data sequence to be permuted, the data sequence having a plurality of data items, and a coding device configured to apply a permutation to the data sequence and generate a permuted data sequence. The coding device includes a permutation device configured to obtain information associated with the data sequence to be permuted, the information containing at least a length of the data sequence and a sampling spacing for permuting the data sequence. The permutation device is also configured to identify a first portion of the data sequence having a first number of adjacent data items, and a second portion of the data sequence having a second number of adjacent data items. The permutation device is further configured to access the first number of data items from the first portion at the sampling spacing, place the accessed first number of data items into a predetermined number of sub-blocks included within the permuted data sequence, and insert each of the second number of data items into an end position of one of the sub-blocks within the permuted data sequence. The system further includes an output interface configured to output the permuted data sequence for wireless communication.

DETAILED DESCRIPTION

Figure 1:
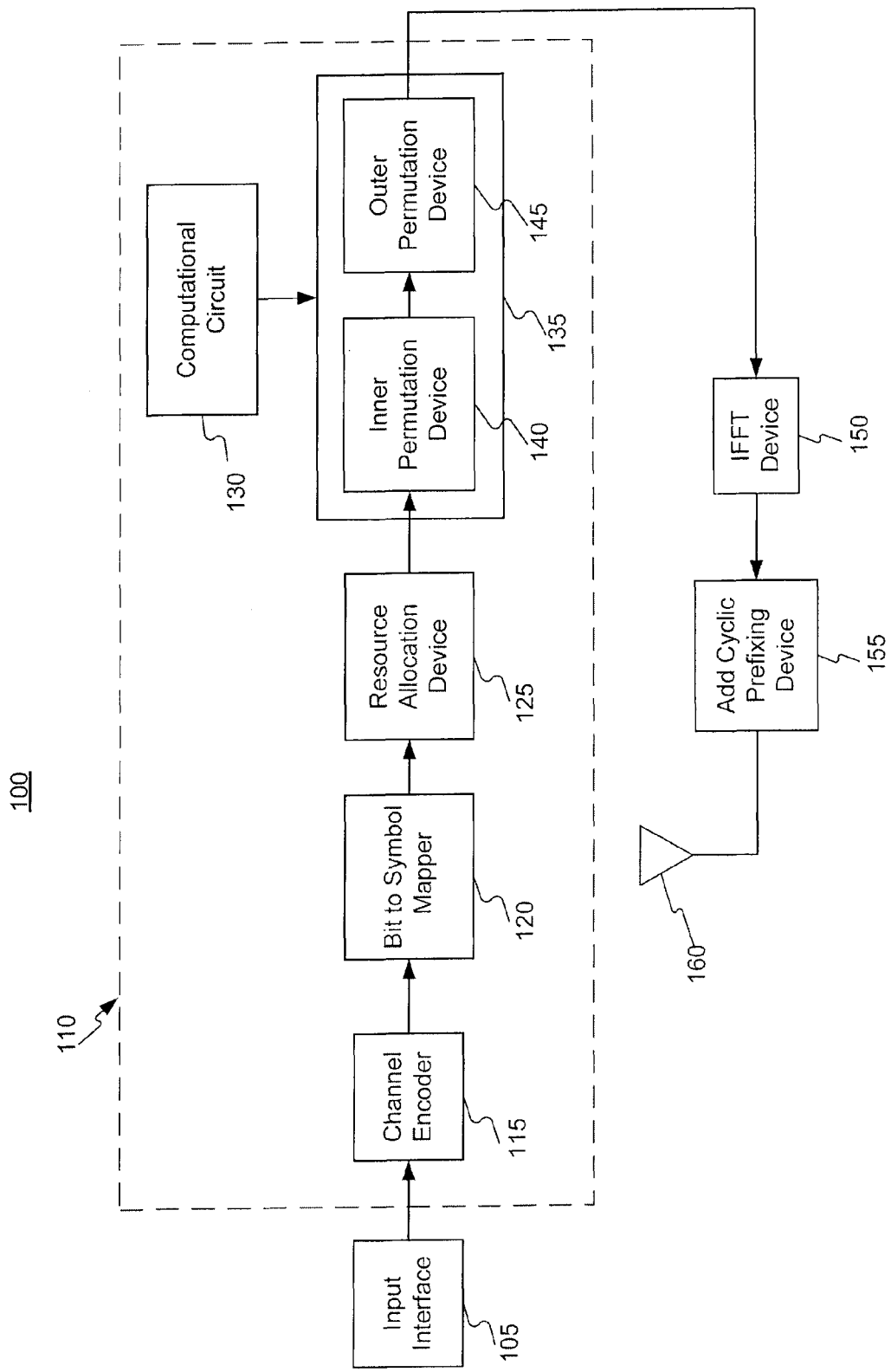
FIG. 1 illustrates a schematic block diagram of an exemplary system for wireless communication consistent with the disclosed embodiments.

FIG. 1 schematically illustrates an exemplary system 100 consistent with the disclosed embodiments. The system 100 may be a part of a wireless communication system, for example, a coded OFDM communication system at a transmitter side. The system 100 may include an input interface 105 configured to receive an input of a data stream, which may include at least one data sequence having, for example, uncoded data bits. The system 100 may include a coding device 110 configured to apply a coding, such as a turbo coding and/or a permutation to the data stream. In one embodiment, the coding device 110 may include a channel encoder 115, a bit to symbol mapper 120, and a resource allocation device 125. The channel encoder 115 may receive the input data stream including uncoded data bits, and may encode the data stream using any suitable techniques, such as, for example, convolutional turbo coding. Coded data bits may then be mapped into data symbols of a predetermined length by the bit-to-symbol mapper 120. The resource allocation device 125 may be configured to distribute the data symbols onto one or more subcarrier frequencies in frequency domain, and may form a number of logical resource units (LRUs). Each LRU may be in form of an $N_F$ by $N_T$ matrix, where $N_F$ and $N_T$ may be integer numbers, with $N_F$ indicating the number of subcarrier frequencies, and $N_T$ indicating the number of symbols. Each row of the LRU may correspond to a subcarrier frequency, and each column of the LRU may correspond to a symbol or a time index. As a result, each small block of the $N_F$ by $N_T$ matrix in the LRU may correspond to a subcarrier, which further corresponds to a combination of a subcarrier frequency and a time index. Thus, each LRU may include $N_F$ by $N_T$ subcarriers.

In one embodiment, the coding device 110 may also include a computational circuit 130 configured to compute a permutation sequence based on a content of the at least one data sequence of the data stream. The computed permutation sequence may be a non-predetermined sequence. In other words, the permutation sequence may be computed based on the data sequence to be permuted and may not be retrieved from a lookup table, for example, that contains predetermined permutation sequences. The coding device 110 may also include a permutation device 135 configured to apply a permutation to the data stream based on the permutation sequence computed by the computational circuit 130. In one embodiment, the permutation device 135 may include an inner permutation device 140, or an outer permutation device 145, or both. Each of the inner and outer permutation devices 140 and 145 may be configured to permute the data stream based on computed permutation sequences. For example, the inner permutation device 140 may be configured to perform an inner permutation on the data stream at the subcarrier level by permuting the subcarriers, whereas the outer permutation device 145 may be configured to perform an outer permutation on the data stream at the resource unit level by permuting the resource units.

As shown in FIG. 1, the data stream may be first permuted by the inner permutation device 140 and then be permuted by the outer permutation device 145. The data stream may also be first permuted by the outer permutation device 145 and then be permuted by the inner permutation device 140. The permutation device 135 may include separate inner and outer permutation devices 140 and 145, as shown in FIG. 1, or alternatively, may include a single permutation module configured to perform both the inner and outer permutations.

A plurality of physical resource units (PRUs) may be formed after the logical resource units are permuted by the permutation device 135. The permuted data stream including the physical resource units may be further processed by an Inverse Fast Fourier Transformation (IFFT) device 150, which may apply a suitable inverse Fast Fourier Transformation algorithm to the permuted data stream. The system 100 may also include an Add Cyclic Prefixing device 155, which may add a cyclic prefixing to the permuted data stream based on a predetermined algorithm. The permuted data stream may be output by an output interface 160 for wireless transmission, which may be, for example, a wireless communication antenna. The system 100 may include a greater or lesser number of components.

Figure 2:
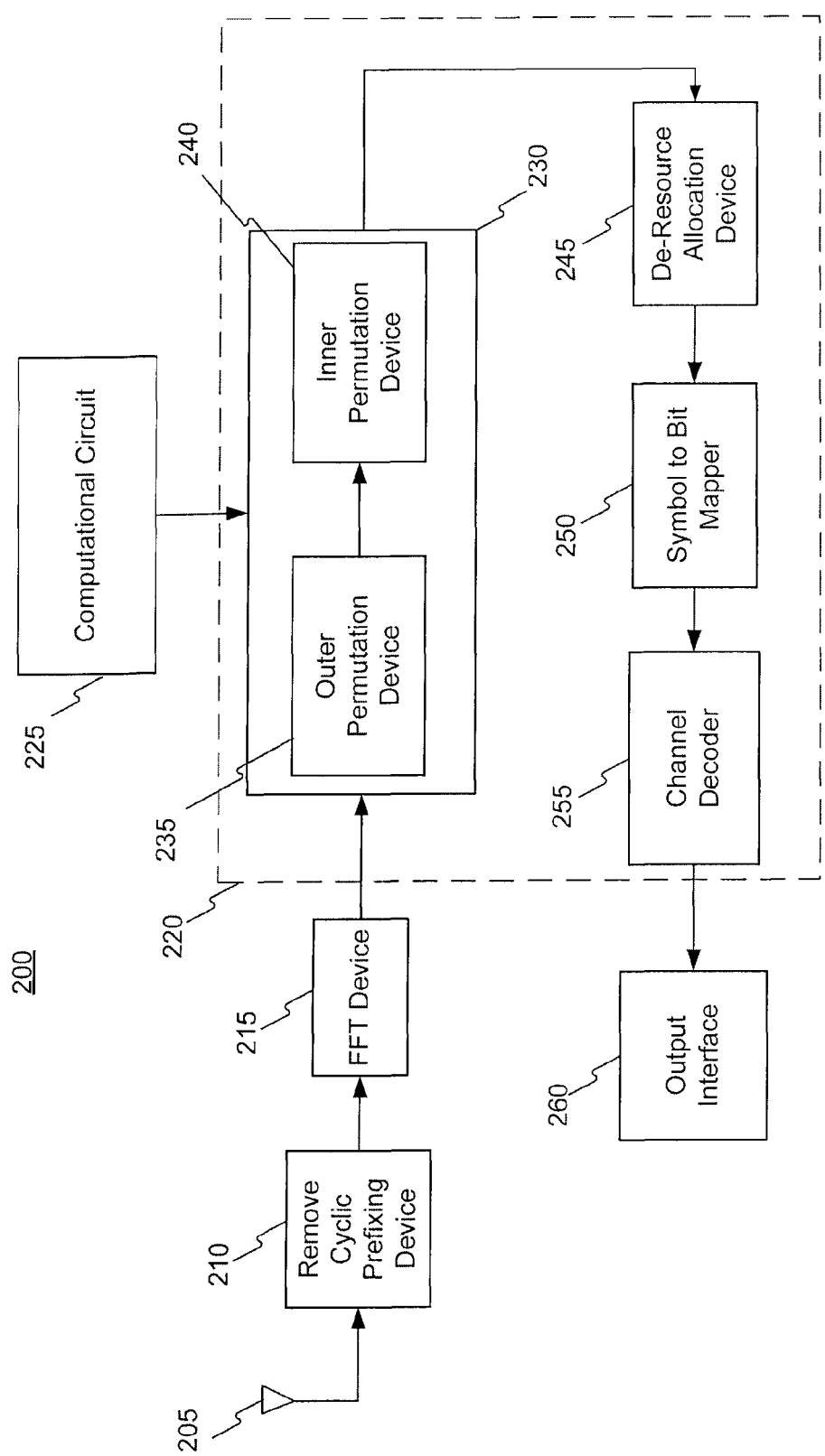
FIG. 2 illustrates a schematic block diagram of an exemplary system for wireless communication consistent with the disclosed embodiments.

FIG. 2 schematically illustrates an exemplary system 200 consistent with the disclosed embodiments. The system 200 may be at least a part of a wireless communication system, for example, a coded OFDM communication system at the receiver side. The system 200 may include a data receiving device 205, such as, for example, an antenna configured to receive a signal containing a data stream. The data stream may be the data stream transmitted from the system 100 on the transmitter side, and may contain at least one data sequence.

The system 200 may include a Remove Cyclic Prefixing device 210 configured to remove a cyclic prefixing, which may have been added to the data stream by the Add Cyclic Prefixing device 155 on the transmitter side. The system 200 may include a Fast Fourier Transformation device 215, which may be located downstream of the Remove Cyclic Prefixing device 210. The Fast Fourier Transformation device 215 may be configured to apply a suitable Fast Fourier transformation to the data stream. The system 200 may include a decoding device 220. The decoding device 220 may include a plurality of devices, such as, for example, a computational circuit 225, a permutation device 230, a de-resource allocation device 245, a symbol to bit mapper 250, and a channel decoder 255.

The decoding device 220 may be configured to apply one or more coding or decoding processes to the data stream. It is noted that a decoding process may also be referred to as a coding process in a reversed direction. Thus, the decoding device 220 may also be referred to as a coding device. The computational circuit 225 may be similar to the computational circuit 130 shown in FIG. 1. The computational circuit 225 may be configured to compute permutation sequences based on a content of the at least one data sequence of the data stream. The computed permutation sequence may be a non-predetermined sequence. In other words, the permutation sequence may be computed based on a content of the data sequence to be permuted by the computational circuit 225, and may not be retrieved from a lookup table that contains predetermined permutation sequences. The permutation device 230 may perform permutations, such as inner and/or outer permutations on the data stream based on the permutation sequences computed by the computational circuit 225. The permutation device 230 may include an outer permutation device 235 and/or an inner permutation device 240.

The outer permutation device 235 may be similar to the outer permutation device 145 of FIG. 1 on the transmitter side, and may be configured to apply an outer permutation to the data stream. The inner permutation device 240 may be similar to the inner permutation device 140 of FIG. 1 on the transmitter side, and may be configured to apply an inner permutation to the data stream. Alternatively, the outer permutation device 235 and the inner permutation device 240 may also be different from the outer permutation device 145 and the inner permutation device 140, respectively. The outer permutation device 235 and the inner permutation device 240 may each apply a permutation to the data stream that has already been permuted by the outer permutation device 145 and the inner permutation device 140.

Still referring to FIG. 2, after the data stream is permuted by the outer permutation device 235 and/or the inner permutation device 240, the data stream may be further processed by the de-resource allocation device 245. The de-resource allocation device 245 may perform a process reverse to the process performed by the resource allocation device 125. Specifically, the de-resource allocation device 245 may, de-allocate or separate, in each resource unit, data symbols from subcarrier frequencies, to which the data symbols have already been allocated, for example, by the resource allocation device 125.

The data symbols may be further de-mapped into data bits through the symbol to bit mapper 250, and decoded through the channel decoder 255. For example, the channel decoder 255 may apply a suitable algorithm to remove a coding, such as a turbo code that has been applied to the data stream by the channel encoder 115 on the transmitter side, thereby decoding the data stream. The process performed by the channel decoder 255 may be a process reverse to the process performed by the channel encoder 115. The data stream containing decoded data bits may be output through an output interface 260 for wireless transmission. The output interface 260 may include an antenna or other output devices known in the art.

Figure 3:
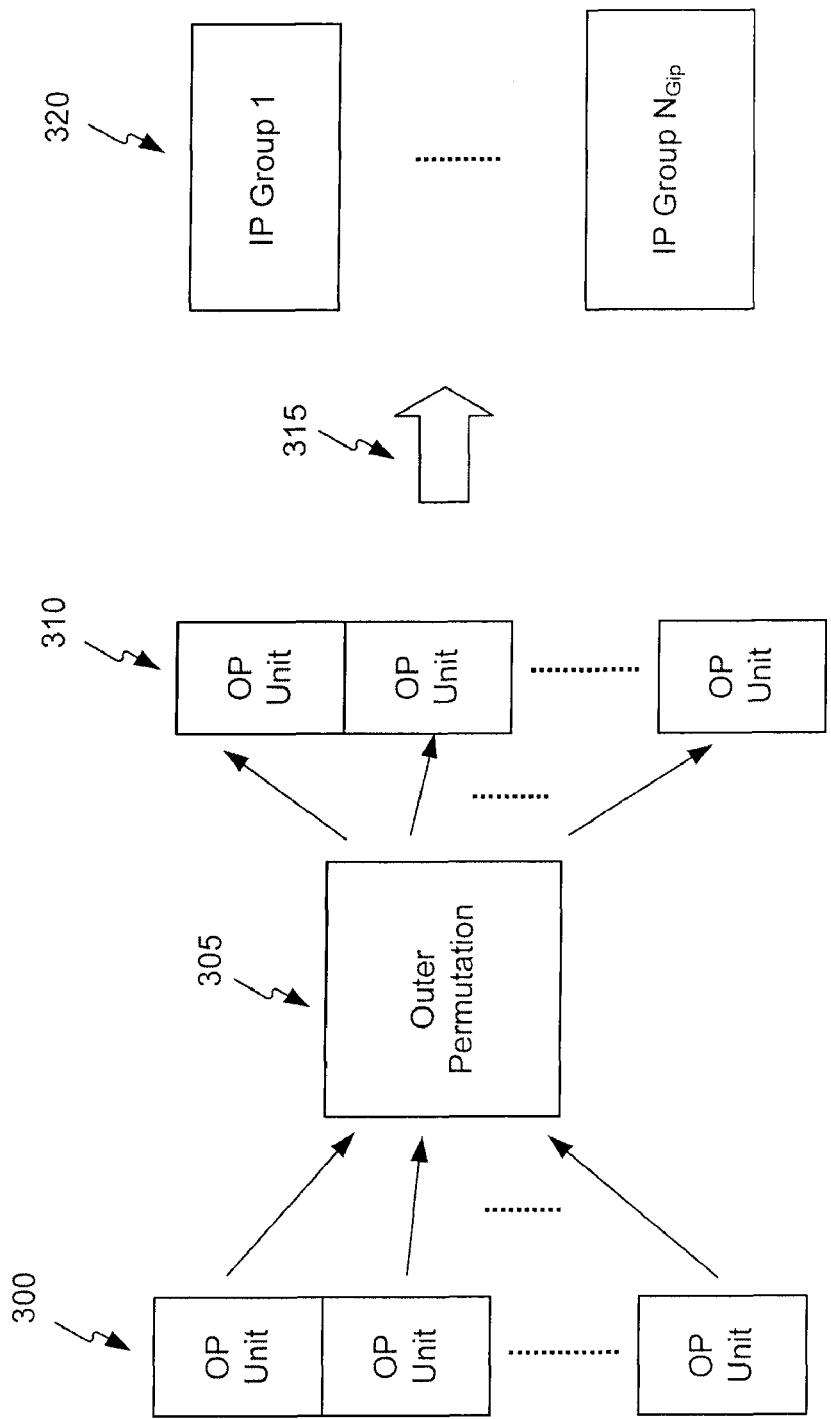
FIG. 3 is a diagrammatic illustration of an outer permutation operation consistent with the disclosed embodiments.

FIG. 3 illustrates a schematic diagram of an exemplary outer permutation consistent with the disclosed embodiments, which may be performed by an outer permutation device, for example, the outer permutation device 235 of system 200 on the receiver side of a communication system. Alternatively, the outer permutation may also be performed by the outer permutation device 145 of system 100 on the transmitter side of the communication system. The outer permutation may be performed on a first data stream 300, which may contain a plurality of outer permutation units (OP units). Each outer permutation unit (OP unit) may include at least one physical resource unit (PRU). In one embodiment, each outer permutation unit may include a miniband. Each miniband may include one or more adjacent physical resource units. In one embodiment, each outer permutation unit may include a plurality of groups of physical resource units or distributed resource units.

An outer permutation 305 may be applied to the first data stream 300. The outer permutation 305 may be employed by the outer permutation device 235. An order of the outer permutation units may be rearranged based on an outer permutation sequence or an outer permutation algorithm. A second data stream 310 may be generated by the outer permutation 305. The second data stream 310 may include the same outer permutation units rearranged in an order different from the order of the outer permutation units within the first data stream 300. Through a process 315, the second data stream 310 may be rearranged into a third data stream 320, which may be in a form different from the form of the second data stream 310. For example, the first and the second data streams 300 and 310 may be in a vector form, where the plurality of outer permutation units are arranged in a column. The third data stream 320 may be in a matrix form, where the plurality of outer permutation units from the second data stream 310, or a plurality of second data streams 310, may be rearranged as elements of the matrix form in the third data stream 320. In one embodiment, the third data stream 310 may include a plurality of inner permutation groups (e.g., IP group 1 to IP group $N_{Gip}$, where $N_{Gip}$ is an integer number) to be permuted by an inner permutation. The outer permutation may include a miniband permutation, where minibands may be permuted based on a permutation sequence. After the miniband permutation, the order of the minibands may be changed.

Figure 4:
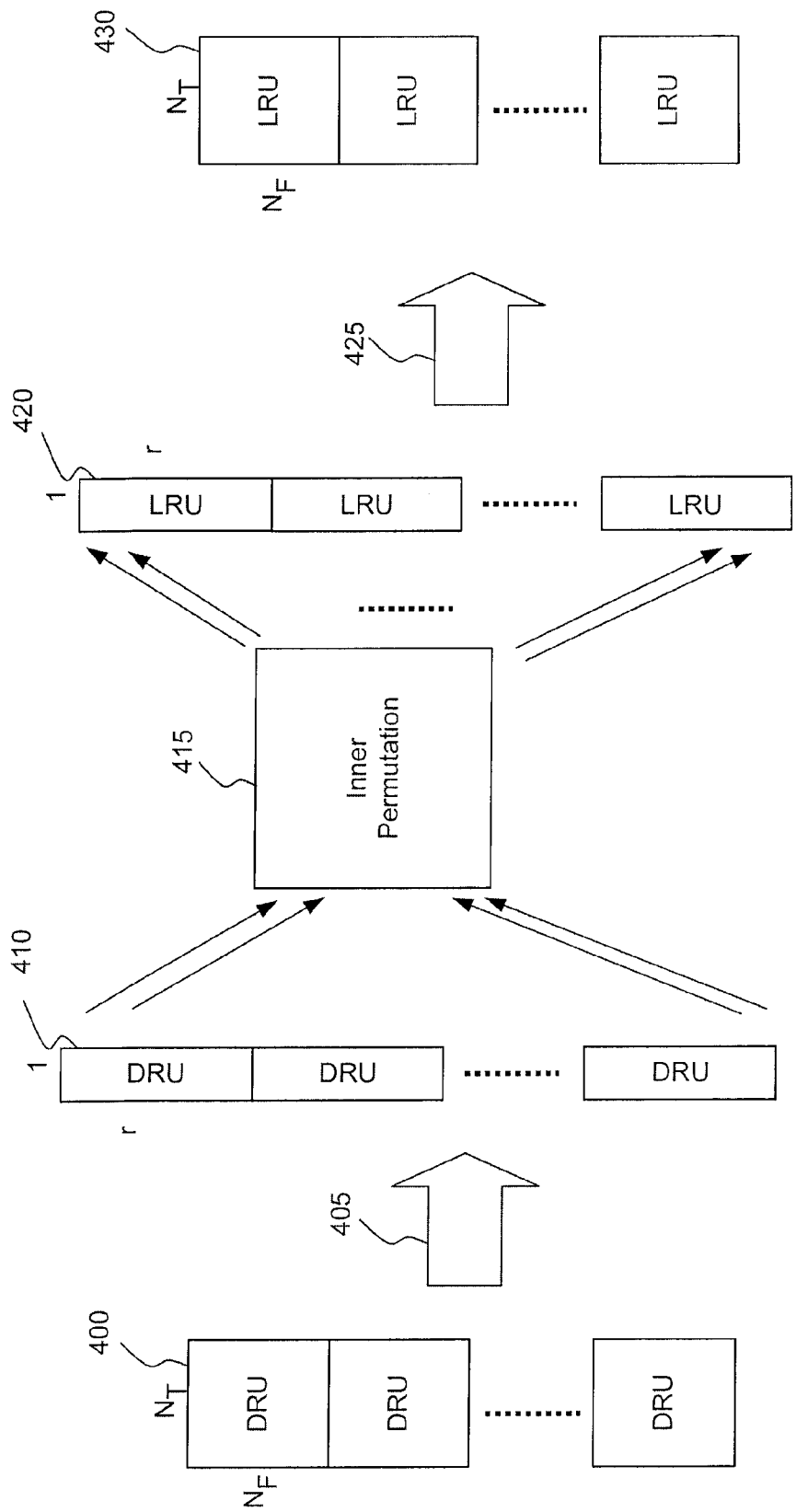
FIG. 4 is a diagrammatic illustration of an inner permutation operation consistent with the disclosed embodiments.

FIG. 4 schematically illustrates an exemplary inner permutation consistent with the disclosed embodiments. The inner permutation illustrated in FIG. 4 may be performed by the inner permutation device 240 of the system 200 on the receiver side, or the inner permutation device 140 of the system 100 on the transmitter side.

The inner permutation may be performed on a fourth data stream 400, which may include $N_{RU,ip}$ distributed resource units (DRUs), where $N_{RU,ip}$ may be an integer number. The fourth data stream 400 may be at least part of the third data stream 310 generated by the outer permutation 305 shown in FIG. 3. For example, the fourth data stream 400 may be one of the plurality of inner permutation groups (IP group 1 to IP group $N_{Gip}$), or may be a portion of all the plurality of inner permutation groups (IP group 1 to IP group $N_{Gip}$). The fourth data stream 400 may be arranged in a matrix form. The DRUs within the fourth data stream 400 may be associated with an index number, for example, from 0 to $N_{RU,ip}-1$. Each DRU may be in a matrix form, and may include $N_F$ by $N_T$ subcarriers, with $N_F$ frequencies associated with $N_T$ symbols. The fourth data stream 400 may include a total of $N_T*N_F*N_{RU,ip}$ subcarriers.

A process 405 may be applied to the fourth data stream 400 to pre-process the fourth data stream 400 before an inner permutation 415 is applied. The process 405 may re-arrange the fourth data stream 400 into a vector form, such as, for example, a column having r by 1 subcarriers, r being an integer number indicating a number of rows. In one embodiment, the entire fourth data stream 400 may be re-arranged into a fifth data stream 410 having a single column, with the row number r being $N_T*N_F*N_{RU,ip}$. In such an embodiment, each matrix DRU of the fourth data stream 400 may be re-arranged into a column of size $(N_F*N_T)$ by 1.

In one embodiment, the fourth data stream 400 may be re-arranged into a plurality of fifth data streams 410. For example, each fifth data stream 410 may be formed based on a column of the fourth data stream 400, or in other words, a symbol from the fourth data stream 400. In such an embodiment, the number of rows r may be $N_F*N_{RU,ip}$, and the fourth data stream 400 may be re-arranged into $N_T$ columns, each column forming one of the plurality of fifth data streams 410.

The inner permutation 415 may be applied to the fifth data stream 410, and may re-arrange the order of the subcarriers of the fifth data stream 410 based on an inner permutation sequence or an inner permutation algorithm. The fifth data stream 410 having a plurality of distributed resource units (DRUs), after being permuted by the inner permutation 415, may become a sixth data stream 420 having a plurality of logical resource units (LRUs). The sixth data stream 420 may be in a vector form, such as, for example, a column or a row. The sixth data stream 420 may include the same number of resource units as the fifth data stream 410, for example, r by 1. A process 425 may be applied to the sixth data stream 420 to generate a seventh data stream 430.

The seventh data stream 430 may be in a matrix form, and may include $N_{RU,ip}$ LRUs. Each LRU may be in a matrix form including $N_T*N_F$ subcarriers, with $N_T$ being a number of rows indicating a number of frequencies, and $N_F$ being a number of columns indicating a number of symbols. The seventh data stream 430 may be formed from the sixth data stream 420 or a plurality of sixth data streams 420.

The inner permutation 415 may be performed at the subcarrier level. That is, the inner permutation 415 may be performed by permuting the subcarriers of the fifth data stream 410 based on an inner permutation sequence.

The inner permutation sequence may be computed based on at least one of the following equations (1) and (2):

$$Sca_{output}(k,s) = N_{RU,ip}*n_k + \{P_s[n_k \bmod N_{RU,ip}] + \text{PermBase}\} \bmod N_{RU,ip} \quad (1)$$

$$P_0(j) = j+1, \text{ where, } j=0, 1, \ldots, N_{RU,ip}-1. \quad (2)$$

In equation (1), $Sca_{output}(k,s)$ may stand for a permutation output index number in the resulting permuted data sequence generated by the inner permutation. s may stand for an index number of a resource unit among the total $N_{RU,ip}$ resource units (e.g., DRU or LRU) to be permuted. For example, s may be any integer number from 0 to $N_{RU,ip}-1$. $n_k$ may equal to $(k+13*s) \bmod N_{unit}$, where $N_{unit}$ may be the total number of subcarriers within a resource unit. $N_{unit}$ may be an integer number. k may stand for an index number of a subcarrier within a resource unit, and may be an integer number from 0 to $N_{unit}-1$. PermBase may be an integer number ranging from 0 to $N_{PermBase}-1$, where $N_{PermBase}$ may be an integer number associated with base stations of the communication system.

$P_0$ may be referred to as a basic inner permutation sequence. Sequence $P_s$ may be obtained by cyclically shifting the basic permutation sequence $P_0$ to the left by s times. Alternatively, sequence $P_s$ may be obtained by cyclically shifting the basic permutation sequence $P_0$ to the right by s times. The result of $(n_k \bmod N_{RU,ip})$ may be an index number for the data sequence $P_s$. For example, if s=0, $P_0=[1, 2, \ldots, N_{RU,ip}]$, then each element of $P_0$ is $P_0(1)=1$, $P_0(2)=2$, etc. If s=1, then $P_1$ may be obtained by cyclically shifting $P_0$ to the left by 1 time, thus, $P_1=[2, 3, \ldots, N_{RU,ip}, 1]$, and each element may be determined as $P_1[1]=2$, $P_1[2]=3$, etc.

The permutation sequences determined by equations (1) and (2) may be computed using a computational circuit. Permutation sequences generated by equations (1) and (2) may be utilized in an inner permutation on the receiver side of the communication system. In some embodiments, the permutation sequences generated by equations (1) and (2) may also be applied to an inner permutation on the transmitter side of the communication system.

Figure 5:
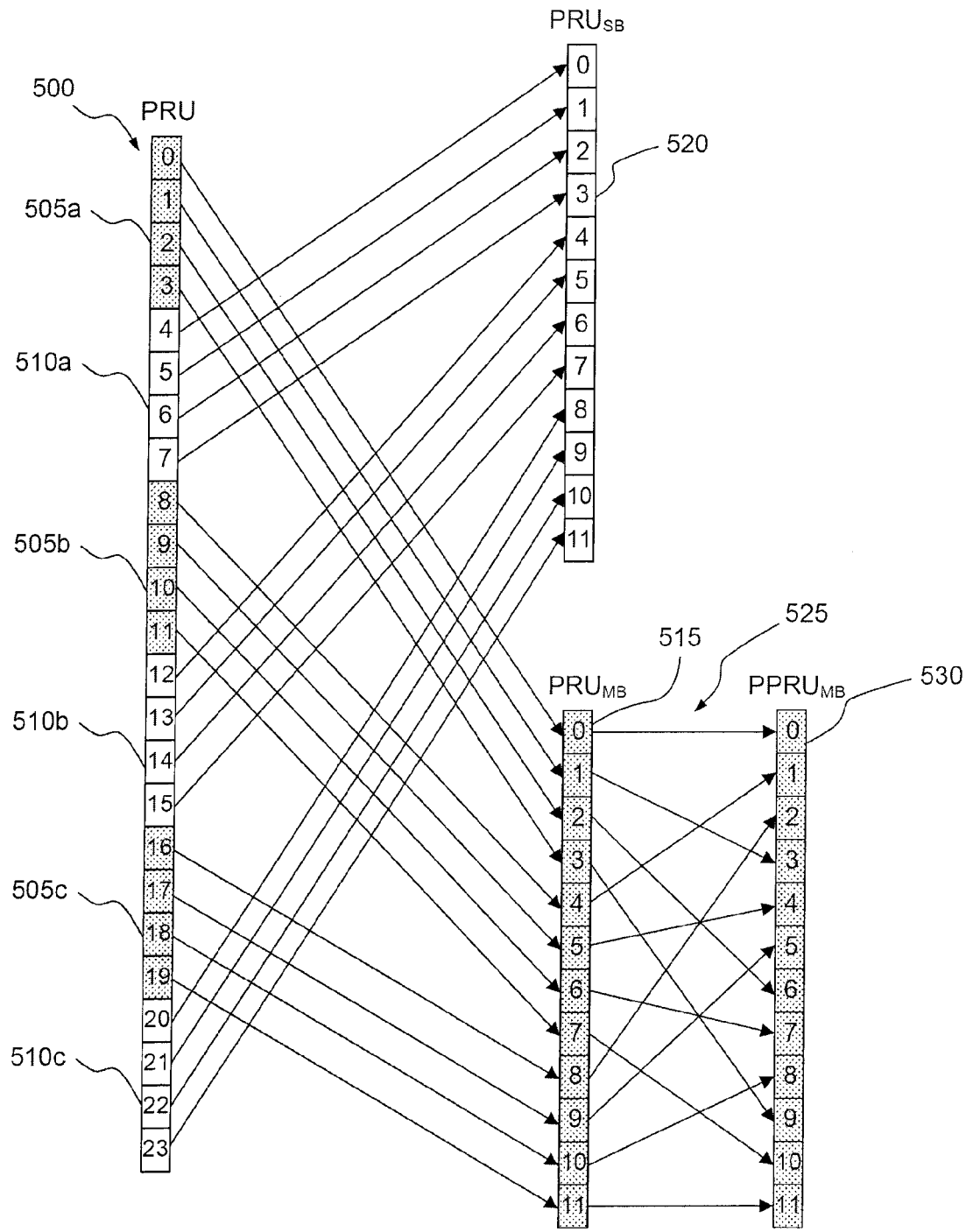
FIG. 5 is a diagrammatic illustration of a permutation process consistent with the disclosed embodiments.

FIG. 5 is a diagrammatic illustration of a permutation process consistent with the disclosed embodiments. In FIG. 5, an eight data stream 500 may include a plurality of physical resource units (PRUs). The plurality of physical resource units may be divided into a first plurality of PRUs including, for example, PRU 505a, 505b, and 505c, and a second plurality of PRUs including, for example, PRU 510a, 510b, 510c. The first plurality of PRUs including 505a, 505b, and 505c may be used to form a ninth data stream 515, denoted as $PRU_{MB}$ 515, and having one or more minibands. The second plurality of PURs including 510a, 510b, and 510c may be used to form a tenth data stream 520, denoted as $PRU_{SB}$ 520, and having one or more subbands. Subbands may be used for allocation of PRUs to selective continguous frequencies. Minibands may be used for allocation of PRUs to diverse frequencies, which may increase the randomness of the PRU allocation and the error correcting capability of the communication system.

A subband may include $N_1$ adjacent PRUs. A miniband may include $N_2$ adjacent PRUs. $N_1$ and $N_2$ are integer numbers. In one embodiment, $N_1=4$ and $N_2=1$. The total number of minibands in an allocation of PRUs may be denoted as $K_{MB}$, and the total number of PRUs allocated to minibands may be denoted as $L_{MB}$. Therefore, $L_{MB}=N_2*K_{MB}$. The total number of minibands $K_{MB}$ is also referred to as a length of the ninth data stream $PRU_{MB}$ 515.

A miniband permutation 525 may be applied to the ninth data stream $PRU_{MB}$ 515 based on a permutation sequence or algorithm. The total number of minibands included in the ninth data stream $PRU_{MB}$ 515 may be represented by $K_{MB}$. A eleventh data stream $PPRU_{MB}$ 530 may be generated by the miniband permutation applied to the ninth data stream $PRU_{MB}$ 515, and may be referred to as a permuted $PPRU_{MB}$ 515. The miniband permutation 525 may be part of the outer permutation 305. The outer permutation may include two parts, the miniband permutation and a subband permutation, which is not discussed herein.

Figure 6:
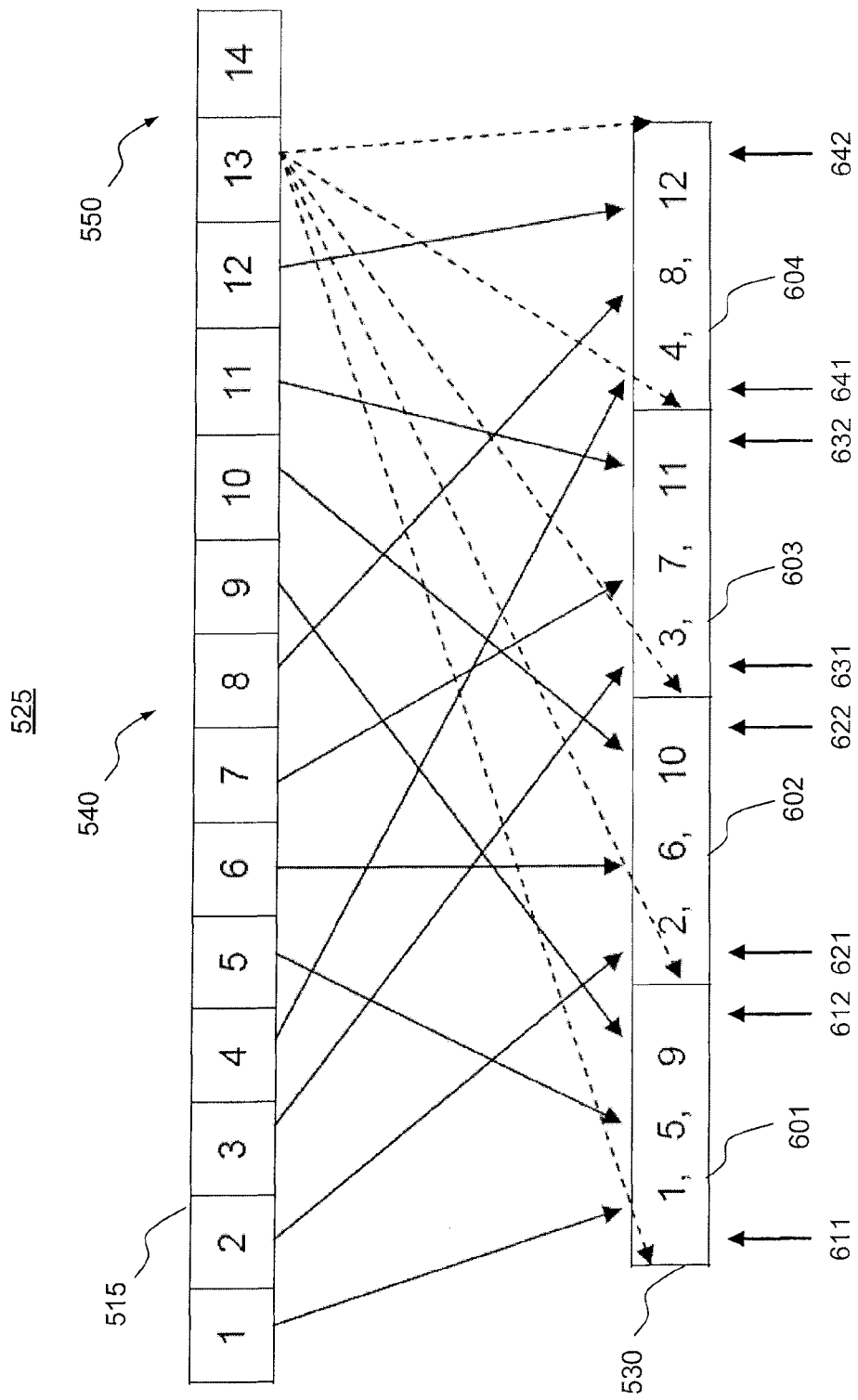
FIG. 6 is a schematic illustration of an exemplary miniband permutation consistent with the disclosed embodiments.

FIG. 6 illustrates an exemplary miniband permutation 525. The ninth data stream $PRU_{MB}$ 515 is illustrated as [1, 2, 3, 4, 5, 6, 7, 8, 9, 10, 11, 12, 13, 14]. The numbers 1-14 may represent positions 1-14 within the ninth data stream $PRU_{MB}$ 515, and each position (e.g., position 1, 2, . . . , 14) may represent an data item, such as, for example, a miniband. Therefore, the ninth data stream $PRU_{MB}$ 515 may contain 14 data items (e.g., minibands). Thus, $K_{MB}=14$. When the miniband permutation 525 is applied to the ninth data stream $PRU_{MB}$ 515, the ninth data stream $PRU_{MB}$ 515 may be transformed into the permuted eleventh data stream $PPRU_{MB}$ 530. The permuted eleventh data stream $PPRU_{MB}$ 530 may include the same number of data items as the ninth data stream $PRU_{MB}$ 515. The positions of the permuted eleventh data stream $PPRU_{MB}$ 530 may be virtually or actually divided into a plurality of sub-blocks. The number of sub-blocks may be predetermined based on the length of the data sequence and a sampling spacing. It is noted that the permuted eleventh data stream $PPRU_{MB}$ 530 is incomplete because it does not show the data items 13 and 14, which may be placed to a plurality of end positions of the sub-blocks.

The input ninth data stream $PRU_{MB}$ 515 may be an input data stream to a permutation device, such as, for example, the permutation device 230 shown in FIG. 2. The miniband permutation 525 may rearrange the positions of data items within the ninth data stream $PRU_{MB}$ 515 by accessing a data item from a first position in the ninth data stream $PRU_{MB}$ 515, and placing the data item in a second position in the permuted eleventh data stream $PPRU_{MB}$ 530, where the first and the second position numbers may be different.

The miniband permutation 525 is further explained as follows. First, the permutation device 230 may receive the input ninth data stream $PRU_{MB}$ 515. System parameters, such as, for example, a sampling spacing P, may be determined. The sampling spacing P determines the number of positions between two consecutively sampled data items. For example, if P=4, the difference between the position of the first data item that is accessed and the position of the second data item that is accessed will be 4. In the example shown in FIG. 6, the data items will be accessed following the order at positions 1, 5, 9 . . . etc. The sampling spacing P may also indicate the difference between the positions of two consecutively placed data items. For example, data item 1 from the ninth data stream $PRU_{MB}$ 515 may be placed in the first position of the permuted data sequence, e.g., the eleventh data stream $PPRU_{MB}$ 530, and data item 2 from the ninth data stream $PRU_{MB}$ 515 may be placed in the fourth position of the permuted data sequence, e.g., the eleventh data stream $PPRU_{MB}$ 530. The difference between the positions of the first data item 1 and the second data item 2 within the permuted data sequence may be associated with the sampling spacing P.

Before accessing the data items from the input ninth data stream $PRU_{MB}$ 515, a first portion 540 having a first number of adjacent data items, and a second portion 550 having a second number of adjacent data items may be determined based on the input ninth data stream $PRU_{MB}$ 515. The first portion 540 may have a first length, e.g., the first number of adjacent data items. The second portion 550 may have a second length, e.g., the second number of adjacent data items. The sum of the first and second lengths may equal to the length of the ninth data stream $PRU_{MB}$ 515. The determination may be based on a result of ($K_{MB}$ mod P). The first portion 540 may contain the first 1 to $K_{MB}$–($K_{MB}$ mod P) data items, and the second portion 550 may contain the last ($K_{MB}$ mod P) data items, from $K_{MB}$–($K_{MB}$ mod P)+1 to $K_{MB}$ data items. If ($K_{MB}$ mod P)=0, then the first portion 540 may contain all $K_{MB}$ data items of the entire input ninth data stream $PRU_{MB}$ 515, and the second portion 550 may contain 0 data items. The miniband permutation 525 may first process the first portion 540. The resulting eleventh data stream $PPRU_{MB}$ 530 may be virtually or actually divided into floor ($K_{MB}$/P) sub-blocks, each sub-block having a uniform number of ($K_{MB}$–($K_{MB}$ mod P))/P positions for data items from the first portion 540.

In the example shown in FIG. 6, assuming P=4, then ($K_{MB}$ mod P)=2. Therefore, the first portion 540 contains $K_{MB}$–($K_{MB}$ mod P)=12 data items [1, 2, 3, 4, 5, 6, 7, 8, 9, 10, 11, 12], while the second portion 550 contains the last ($K_{MB}$ mod P)=2 data items, i.e., data items 13 and 14, which may also be referred to as residual data items. The resulting eleventh data stream $PPRU_{MB}$ 530 may be virtually or actually divided into floor ($K_{MB}$/P)=4 sub-blocks, a first sub-block 601, a second sub-block 602, a third sub-block 603, and a fourth sub-block 604. Each sub-block may have a uniform number of ($K_{MB}$–($K_{MB}$ mod P))/P=3 data items from the first portion 540.

The miniband permutation 525 may access data items from the first portion 540 according to the sampling spacing P until the position to be accessed falls out of the range of the first portion 540. For example, the miniband permutation 525 may access data items [1, 5, 9] sequentially from the first portion 540. Because 9+4=13, which falls out of the range of the first portion 540, the miniband permutation 525 returns to the beginning of the first portion 540, and starts accessing from the number 2 position at the predetermined sampling spacing P, e.g., [2, 6, 10]. The data items from the first portion 540 may be placed into the first sub-block 601 of the resulting eleventh data stream $PPRU_{MB}$ 530 in an order same as the order the data items are accessed. As shown in FIG. 5, [1, 5, 9] are placed into the first sub-block 601. Similarly, [2, 6, 10] are accessed from the first portion 540 and placed into the second sub-block 602, [3, 7, 11] are accessed from the first portion 540 and placed into the third sub-block 603, and [4, 8, 12] are accessed from the first portion 540 and placed into the fourth sub-block 604.

Each sub-block may have a left and a right end position that may be placed with a residual data item. Among the four sub-blocks, there may be eight possible positions, as indicated by first end position 611 and second end position 612 associated with the first sub-block 601, third end position 621 and fourth end position 622 associated with the second sub-block 602, fifth end position 631 and sixth end position 632 associated with the third sub-block 603, and seventh end position 641 and eighth end position 642 associated with the fourth sub-block 604, for placing the residual data items 13 and 14. A plurality of methods may be utilized to determine the end position where the residual data items may be placed. The end position to place the residua data items may be determined based on at least one of a position number of the residual data items to be placed, and a position number of one of the data items within the first portion 540. For example, to place residual data item 13, the end position within the sub-blocks may be determined using the position number (e.g., 13) of the residual data item 13, and a position number (e.g., 5, or 9) of one of the data items within the first portion 540. An exemplary method may include taking any number c (e.g., 5, or 9) from position numbers 1-12, and using the result of (13 mod c) and (14 mod c) to determine the end positions for residual data items 13 and 14.

The disclosed miniband permutation method may place (e.g., insert) a residual data item to any one of the eight possible end positions within the four sub-blocks. For example, data item 13 may be placed into the second end position 612, and data item 14 may be placed into the fourth end position 622. Accordingly, the resulting eleventh data stream $PPRU_{MB}$ 530 may become [1, 5, 9, 13, 2, 6, 10, 14, 3, 7, 11, 4, 8, 12]. For another example, data item 13 may be placed into the first end position 611, and the data item 14 may be placed into the second end position 612. Accordingly, the resulting eleventh data stream $PPRU_{MB}$ 530 may become [13, 1, 5, 9, 14, 2, 6, 10, 3, 7, 11, 4, 8, 12]. In one embodiment, a residual data item may be placed into the left end position (i.e., first end position 611) of the first sub-block 601, or the right end position (i.e., eighth end position 642) of the last sub-block 604. In one embodiment, at least one of the residual data items is placed into a sub-block that is not adjacent to any sub-block placed with one of the second number of data items. For example, residual data item 13 may be placed into the left end position (i.e., first end position 611) of the first sub-block 601, while the residual data item 14 may be placed into the right end position (i.e., eighth end position 642) of the last sub-block 604. Accordingly, the sub-block to which the residual data item 13 is placed is not adjacent to the sub-block to which the residual data item 14 is placed.

In one embodiment, the above disclosed miniband permutation 525 may also be realized by performing a permutation based on a permutation sequence determined from at least one of the following equations:

$$PPRU_{MB}[j]=PRU_{MB}[i], j=0, 1, \ldots, K_{MB}-1; \quad (3)$$

$$i=(q(j) \bmod D)*P+\mathrm{floor}(q(j)/D) \quad (4)$$

$$P=\min(K_{MB}, N_1/N_2) \quad (5)$$

$$r(j)=\max(j-(K_{MB} \bmod P)*D, 0) \quad (6)$$

$$q(j)=j+\text{floor}(r(j)/(D-1)) \quad (7)$$

$$D=\text{floor}(K_{MB}/P+1) \quad (8)$$

where floor ( ), min ( ), max ( ), and mod ( ) are well known mathematical functions.

With the permutation sequence determined from above equations, and following the above described miniband permutation 525, the ninth data stream $PRU_{MB}$ 515=[1, 2, 3, 4, 5, 6, 7, 8, 9, 10, 11, 12, 13, 14] may be transformed into [1, 5, 9, 13, 2, 6, 10, 14, 3, 7, 11, 4, 8, 12].

In one embodiment, the above disclosed miniband permutation 525 may also be realized by performing a permutation based on a permutation sequence determined from at least one of the following equations:

$$PPRU_{MB}[j]=PRU_{MB}[i], j=0, 1, \ldots, L_{MB}-1; \quad (9)$$

$$i=((q(j)\bmod D)*P+\text{floor}(q(j)/D)*N_2)+(j\bmod_2) \quad (10)$$

$$P=\min(L_{MB}, N_1) \quad (11)$$

$$r(j)=\max(\text{floor}(j/N_2)-(L_{MB}\bmod P)*D/N_2, 0) \quad (12)$$

$$q(j)=\text{floor}(j/N_2)+\text{floor}(r(j)/(D-1)) \quad (13)$$

$$D=\text{floor}(L_{MB}/P+1) \quad (14)$$

In prior art, for example, in Reference 1, inner and/or outer permutation sequences may be obtained from a lookup table stored in a memory. This prior art method of obtaining a permutation sequence may require a large number of additional memories or other storage devices for storing the lookup table in certain applications, such as applications where the communication system supports flexible parameters and/or flexible sequence lengths. In some instances, this requirement may lead to increased hardware complexity, operational costs, or both.

Consistent with one embodiment of the present disclosure, the inner and/or outer permutation sequences, including the permutation sequences for the miniband permutation, may be generated using a computational circuit based on at least one content of the data stream to be permuted, such as, for example, a length of the data stream to be permuted. The permutation sequences may be computed based on at least one of equations (1)-(14) using the computational circuit.

Figure 7B:
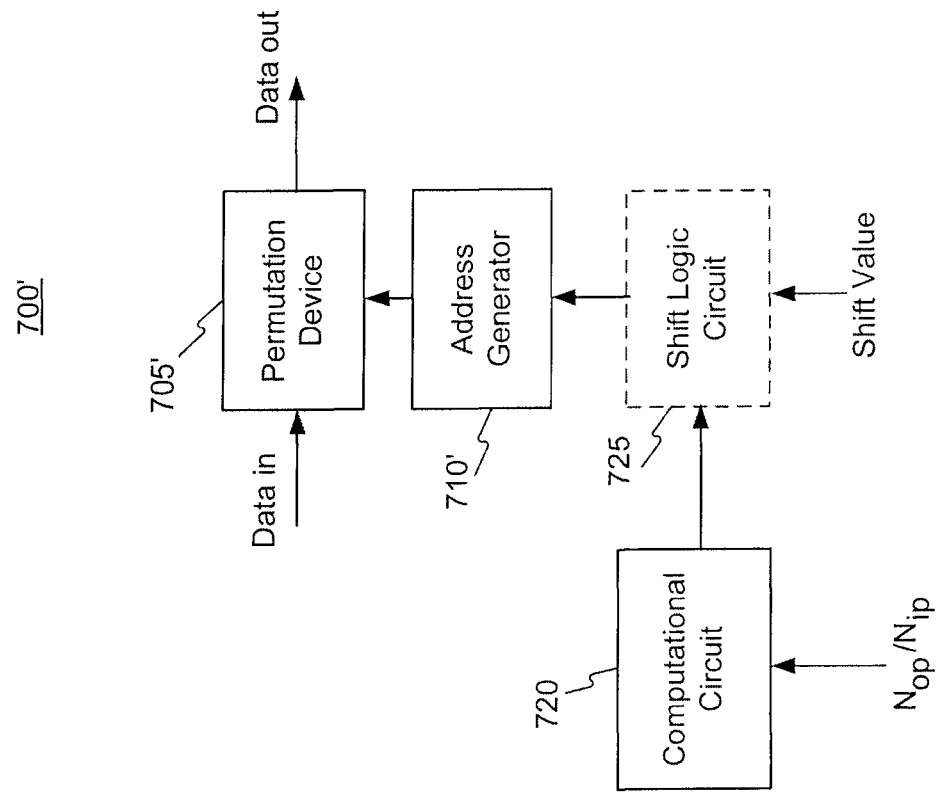
FIG. 7B is a schematic illustration of an exemplary hardware architecture for implementing permutation methods consistent with the disclosed embodiments.
Figure 7A:
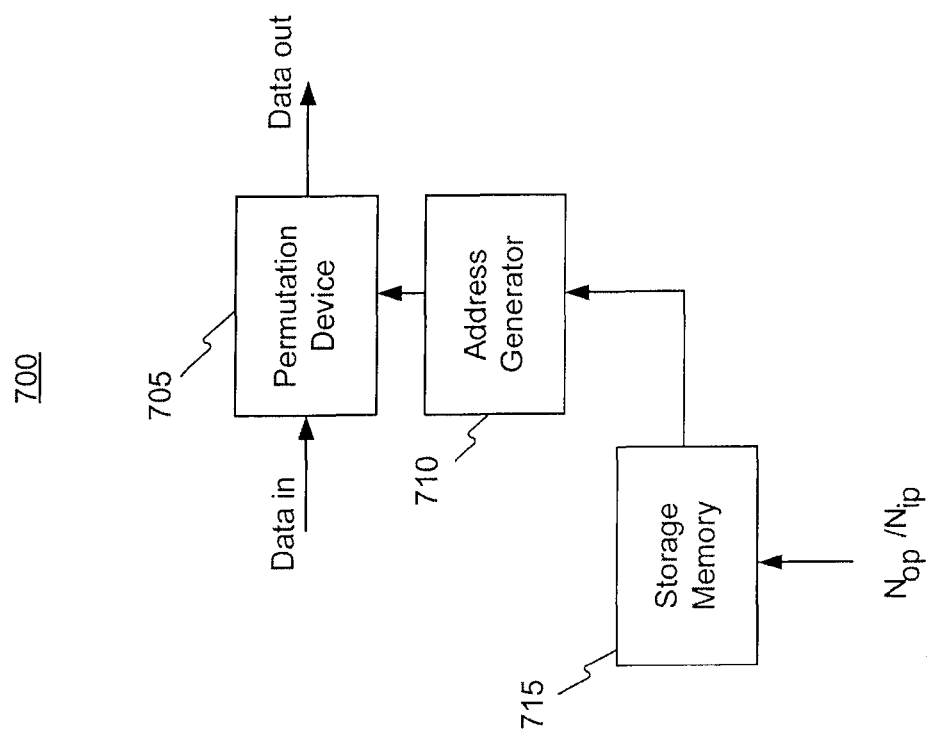
FIG. 7A is a schematic illustration of an exemplary hardware architecture for implementing permutation methods.

FIG. 7A illustrates an exemplary hardware architecture 700 for implementing a permutation method, such as one disclosed in the prior art. As shown in FIG. 7A, the hardware architecture 700 for such a permutation method may include a permuting device 705. The permutation device 705 which may be configured to receive an input data stream, permute the input data stream according to one or more predetermined permutation sequences stored in a lookup table, and generate an output data stream. The lookup table may be stored in a memory, and may contain predetermined permutation sequences for different length of the data stream. Permutation device 705 may include devices known in the art, for example, a memory or a processing unit for performing permutations. An address generator 710 may be configured to provide address information to the permuting device 705 for performing the permutation on the data stream. The hardware architecture 700 may further include a storage memory 715 (or other storage devices) for storing the lookup table that contains predetermined permutation sequences. When a data stream is received, one of the predetermined permutation sequences may be selected from the lookup table based on the length of the received data stream that is to be permuted or based on other parameters, such as, for example, $N_{op}$ and $N_{ip}$ related to outer and/or inner permutations respectively.

FIG. 7B illustrates an exemplary hardware architecture 700' for implementing a permutation method consistent with the disclosed embodiments for generating permutation sequences. The hardware architecture 700' may include a permutation device 705', which may be similar to the permutation device 705 of FIG. 7A, the permutation device 135 shown in FIG. 1, and/or the permutation device 230 shown in FIG. 2. The permutation devices 705' may be configured to apply a permutation to a data stream. The permutation device 705' may receive an input data stream, permute the input data stream according to one or more permutation sequences, and generate an output data stream. The hardware architecture 705' may include an address generator 710', which may be similar to the address generator 710 of FIG. 7A. The hardware architecture 700' may also include a computational circuit 720 configured to generate the permutation sequences for the inner and/or the outer permutations, including the miniband permutation, according to at least one of equations (1)-(14). In one embodiment, the computational circuit 720 may be free of storage memory.

In some embodiments, the hardware architecture 700' may include a shift logic circuit 725 located downstream of the computational circuit 720. The shift logic circuit 725 may be configured to shift data contents of the a data sequence, such as a permutation sequence generated by the computational circuit 720. The shift logic circuit 725 may be configured to cyclically shift the data contents of the data sequence to the right or to the left by a predetermined number of times. For example, the shift logic circuit 725 may be configured to shift the basic inner permutation sequence $P_0$ and generate $P_s$ shown in equations (1) and (2). In some embodiments, the shift logic circuit 725 may be integral with the computational circuit 720, or may be omitted. The hardware architecture 700' for implementing permutation methods consistent with the present disclosure may be part of the system 100 shown in FIG. 1 on the transmitter side of a communication system, or part of the system 200 shown in FIG. 2 on the receiver side of the communication system.

In one embodiment, permutation sequences are non-predetermined, and are computed using the computational circuit 720 based on at least one of the equations (1)-(14) for inner and/or outer permutations, including the miniband permutation. In one embodiment, the permutation sequences may not be stored in a lookup table, and therefore, large amount of additional storage memories or other storage devices may not be needed for storing the permutation sequences. When system parameters of the communication system are changed, permutation sequences may be re-calculated by the computational circuit 720 based on the changed system parameters. The permutation device 705' may obtain a re-calculated permutation sequence from the computational circuit 720 and apply the re-calculated permutation sequence in the inner and/or outer permutations, including the miniband permutation.

In one embodiment, non-predetermined permutation sequences may be computed using the computational circuit 720, and may be stored in an intermediate lookup table that may in turn be stored in a memory. In one embodiment, the memory for storing the lookup table may be part of the permutation device 705'. The intermediate lookup table may be re-configurable, dynamic, or updatable. The permutation sequences may be computed by the computational circuit 720 based on at least one of the equations (1)-(14). The permutation device 705' may obtain a permutation sequence from the intermediate lookup table and apply the permutation sequence to permute the data stream. The permutation sequences stored in the intermediate lookup table may be updated. For example, when system parameters are changed, the computational circuit 720 may re-calculate the permutation sequences based on the changed system parameters. The re-calculated permutation sequences may be used to update or re-configure the intermediate lookup table. The permutation device 705' may obtain a permutation sequence, which may be updated, from the updated or re-configured intermediate lookup table, and apply the permutation sequence to permute the data stream.

The disclosed methods and systems may be employed in wireless communication systems or other systems where data permutation may be performed. For example, the disclosed methods and systems for data permutation may be implemented in the transmitter and/or receiver side of a communication system. In some applications, the disclosed methods for generating data permutation sequences may be implemented using computational circuits without relying on lookup tables or other components that store predetermined permutation sequences. The disclosed embodiments, in some applications, may reduce or eliminate the need of additional memories or other storage devices for storing predetermined permutation sequences. The disclosed methods and systems for data permutation, in some applications, may reduce the complexity of the hardware architecture of a communication system and/or may improve the performance of the communication system. In some applications, the disclosed methods for generating data permutation sequences may be implemented using a computational circuit and may store the computed data permutation sequences in an intermediate lookup table, which may be updated or re-configured using re-calculated permutation sequences when system parameters are changed.

It will be apparent to those skilled in the art that various modifications and variations can be made to the disclosed method and system for data permutation in a communication system. It is intended that the specification and examples be considered as exemplary only, with a true scope of the disclosure being indicated by the following claims and their equivalents.

What is claimed is:

1. A wireless communication method implemented in a communication system, comprising:
receiving a data sequence to be permuted;
obtaining information associated with the data sequence to be permuted, the information containing at least a length of the data sequence and a sampling spacing for permuting the data sequence;
identifying a first portion of the data sequence having a first number of adjacent data items, and a second portion of the data sequence having a second number of adjacent data items;
accessing the first number of data items from the first portion at the sampling spacing;
placing the accessed first number of data items into a predetermined number of sub-blocks included within a permuted data sequence to be generated based on the received data sequence;
inserting each of the second number of data items into an end position of one of the sub-blocks within the permuted data sequence; and
outputting the permuted data sequence.

2. The wireless communication method of claim 1, wherein the first portion includes a first length and the second portion includes a second length, the sum of the first and second lengths equals the length of the data sequence.

3. The wireless communication method of claim 1, wherein the predetermined number of sub-blocks is determined based on the length of the data sequence and the sampling spacing.

4. The wireless communication method of claim 1, wherein the each of the sub-blocks has a uniform number of positions for placing data items from the first portion.

5. The wireless communication method of claim 4, wherein at least one of the second number of data items is inserted into a sub-block that is not adjacent to any sub-block inserted with one of the second number of data items.

6. The wireless communication method of claim 1, further comprising determining the end position for each of the second data items based on at least one of a position number of each of the second number of data items, and a position number of one of the first number of data items within the first portion.

7. The wireless communication method of claim 1, wherein a permutation operation comprising at least one of the identifying, accessing, placing, and inserting operations is conducted based on at least one of following equations:

$$PPRU_{MB}[j]=PRU_{MB}[i], j=0, 1, \ldots, K_{MB}-1;$$

$$i=(q(j) \bmod D)*P+\text{floor}(q(j)/D);$$

$$P=\min(K_{MB}, N_1/N_2);$$

$$r(j)=\max(j-(K_{MB} \bmod P)*D, 0);$$

$$q(j)=j+\text{floor}(r(j)/(D-1));$$

$$D=\text{floor}(K_{MB}/P+1);$$

wherein $K_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

8. The wireless communication method of claim 7, wherein the permutation operation comprising at least one of the identifying, accessing, placing, and inserting operations is a miniband permutation performed based on a miniband permutation sequence determined from at least one of the equations.

9. The wireless communication method of claim 1, wherein a permutation operation comprising at least one of the identifying, accessing, placing, and inserting operations is conducted based on at least one of following equations:

$$PPRU_{MB}[j]=PRU_{MB}[i], j=0, 1, \ldots, L_{MB}-1;$$

$$i=((q(j) \bmod D)*P+\text{floor}(q(j)/D)*N_2)+(j \bmod N_2);$$

$$P=\min(L_{MB}, N_1);$$

$$r(j)=\max(\text{floor }(j/N_2)-(L_{MB} \bmod P)*D/N_2, 0);$$

$$q(j)=\text{floor}(j/N_2)+\text{floor}(r(j)/(D-1));$$

$$D=\text{floor}(L_{MB}/P+1);$$

wherein $L_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

10. The wireless communication method of claim 9, wherein the permutation operation comprising at least one of the identifying, accessing, placing, and inserting operations is a miniband permutation performed based on a miniband permutation sequence determined from at least one of the equations.

11. A wireless communication method implemented in a communication system, comprising:
- receiving a data sequence to be permuted;
- identifying at least a length of the data sequence and a sampling spacing for permutation;
- identifying a first portion and a second portion of the data sequence, the first portion having a first length and containing a first number of adjacent data items, the second portion having a second length and containing a second number of adjacent data items;
- providing a first number of positions within a permuted data sequence for the first number of data items from the first portion based on the sampling spacing;
- providing a second number of positions within the permuted data sequence for the second number of data items based on the first number of determined positions; and
- processing the permuted data sequence for wireless communication.

12. The wireless communication method of claim 11, further comprising placing the first number of data items into the first number of positions within the permuted data sequence, and placing the second number of data items into the second number of positions within the permuted data sequence.

13. The wireless communication method of claim 11, wherein the first number of positions are evenly distributed in a number of sub-blocks, each sub-block having a left end position and a right end position, the method further comprising inserting each of the second number of data items into one of the left or right end position of one of the sub-blocks within the permuted data sequence.

14. The wireless communication method of claim 11, wherein the first number of positions are evenly distributed in a number of sub-blocks, and wherein at least one of the second number of data items is inserted into a sub-block that is not adjacent to any sub-block inserted with one of the second number of data items.

15. The wireless communication method of claim 11, wherein determining the second number of positions for the second number of data items comprising determining the second number of positions based on at least one of a position number of each of the second number of data items and a position number of one of the first number of data items within the first portion.

16. The wireless communication method of claim 11, wherein a permutation comprising at least one of the identifying and providing operations is conducted based on at least one of following equations:

$$PPRU_{MB}[j]=PRU_{MB}[i], j=0, 1, \ldots, K_{MB}-1;$$

$$i(q(j) \bmod D)*P+\text{floor}(q(j)/D);$$

$$P=\min(K_{MB}, N_1/N_2);$$

$$r(j)=\max(j-(K_{MB} \bmod P)*D, 0);$$

$$q(j)=j+\text{floor}(r(j)/(D-1));$$

$$D=\text{floor}(K_{MB}/P+1);$$

wherein $K_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

17. The wireless communication method of claim 16, wherein a permutation comprising at least one of the identifying and providing operations is a miniband permutation performed based on a miniband permutation sequence determined from at least one of the equations.

18. The wireless communication method of claim 11, wherein a permutation comprising at least one of the identifying and providing operations is conducted based on at least one of following equations:

$$PPRU_{MB}[j]=PRU_{MB}[i], j=0, 1, \ldots, L_{MB}-1;$$

$$i=((q(j)\bmod D)*P+\text{floor}(q(j)/D)*N_2)+(j \bmod N_2);$$

$$P=\min(L_{MB}, N_1);$$

$$r(j)=\max(\text{floor}(j/N_2)-(L_{MB} \bmod P)*D/N_2, 0);$$

$$q(j)=\text{floor}(j/N_2)+\text{floor}(r(j)/(D-1));$$

$$D=\text{floor}(L_{MB}/P+1);$$

wherein $L_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

19. The wireless communication method of claim 18, wherein a permutation comprising at least one of the identifying and providing operations is a miniband permutation performed based on at least one of the equations.

20. A system for wireless communication, comprising:
- an input interface configured to receive a data sequence to be permuted, the data sequence having a plurality of data items;
- a coding device configured to apply a permutation to the data sequence and generate a permuted data sequence, the coding device comprising:
  - a permutation device configured to:
    - obtain information associated with the data sequence to be permuted, the information containing at least a length of the data sequence and a sampling spacing for permuting the data sequence;
    - identify a first portion of the data sequence having a first number of adjacent data items, and a second portion of the data sequence having a second number of adjacent data items;
    - access the first number of data items from the first portion at the sampling spacing;
    - place the accessed first number of data items into a predetermined number of sub-blocks included within the permuted data sequence; and
    - insert each of the second number of data items into an end position of one of the sub-blocks within the permuted data sequence; and
- an output interface configured to output the permuted data sequence for wireless communication.

21. The system of claim 20, further comprising a computational circuit configured to compute a permutation sequence based on the length of the data sequence.

22. The system of claim 21, further comprising a shift logic circuit configured to receive the computed permutation sequence from the computational circuit and shift data contents of the permutation sequence.

23. The system of claim 21, wherein the computational circuit is configured to compute the permutation sequence based on at least one of following equations:

$$PPRU_{MB}[j]=PRU_{MB}[i], j=0, 1, \ldots, K_{MB}-1;$$

$$i(q(j) \bmod D)*P+\mathrm{floor}(q(j)/D);$$

$$P=\min(K_{MB}, N_1/N_2);$$

$$r(j)=\max(j-(K_{MB} \bmod P)*D, 0);$$

$$q(j)=j+\mathrm{floor}(r(j)/(D-1));$$

$$D=\mathrm{floor}(K_{MB}/P+1);$$

wherein $K_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

24. The system of claim 23, wherein the permutation device is configured to perform a miniband permutation based on the permutation sequence computed based on at least one of the equations.

25. The system of claim 21, wherein the computational circuit is configured to compute the permutation sequence based on at least one of following equations:

$$PPRU_{MB}[j]=PRU_{MB}[i], j=0, 1, \ldots, L_{MB}-1;$$

$$i=((q(j) \bmod D)*P+\mathrm{floor}(q(j)/D)*N_2)+(j \bmod N_2);$$

$$P=\min(L_{MB}, N_1);$$

$$r(j)=\max(\mathrm{floor}(j/N_2)-(L_{MB} \bmod P)*D/N_2, 0);$$

$$q(j)=\mathrm{floor}(j/N_2)+\mathrm{floor}(r(j)/(D-1));$$

$$D=\mathrm{floor}(L_{MB}/P+1);$$

wherein $L_{MB}$ is an integer number associated with the received data sequence, $N_1$ is an integer number associated with the received data sequence, $N_2$ is an integer number associated with the received data sequence, and j is an index, and wherein $PPRU_{MB}$ denotes the permuted data sequence, and $PRU_{MB}$ denotes the received data sequence.

26. The system of claim 25, wherein the permutation device is configured to perform a miniband permutation based on the permutation sequence computed based on at least one of the equations.

* * * * *